United States Patent
Inoue et al.

(10) Patent No.: US 8,358,485 B2
(45) Date of Patent: Jan. 22, 2013

(54) HOUSING MEMBER FOR USE IN DISK DRIVE APPARATUS, MOTOR UNIT, DISK DRIVE APPARATUS, AND METHOD OF MANUFACTURING HOUSING MEMBER

(75) Inventors: Kiyofumi Inoue, Kyoto (JP); Shozo Tagata, Kyoto (JP); Takahiro Nakamura, Kyoto (JP); Koji Baba, Kyoto (JP); Toshikazu Himeno, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/423,328

(22) Filed: Mar. 19, 2012

(65) Prior Publication Data

US 2012/0250184 A1    Oct. 4, 2012

(30) Foreign Application Priority Data

Mar. 30, 2011   (JP) .................................. 2011-075756

(51) Int. Cl.
  *G11B 17/02* (2006.01)
(52) U.S. Cl. .................................................. 360/99.15
(58) Field of Classification Search ............... 360/99.15, 360/99.21, 99.23, 99.25, 99.08, 99.09, 99.06, 360/99.12, 97.13, 97.14, 97.17, 97.19; 720/649, 606, 692, 651
See application file for complete search history.

(56) References Cited

U.S. PATENT DOCUMENTS

| | | | |
|---|---|---|---|
| 4,899,244 A * | 2/1990 | Morse | 360/133 |
| 5,379,439 A * | 1/1995 | Harrison et al. | 360/72.1 |
| 6,459,260 B1 * | 10/2002 | Bonin et al. | 324/750.25 |
| 6,486,660 B1 * | 11/2002 | Luse et al. | 324/210 |
| 6,562,278 B1 * | 5/2003 | Farnworth et al. | 264/401 |
| 7,127,799 B2 * | 10/2006 | Girard et al. | 29/603.1 |
| 7,886,422 B1 * | 2/2011 | Zhou et al. | 29/603.02 |
| 2008/0020185 A1 | 1/2008 | Macatangay et al. | |
| 2009/0241322 A1 | 10/2009 | Uefune et al. | |

FOREIGN PATENT DOCUMENTS

JP    2009-245570 A    10/2009

* cited by examiner

*Primary Examiner* — Allen Cao
(74) *Attorney, Agent, or Firm* — Keating & Bennett, LLP (57) ABSTRACT

A housing member for use in a disk drive apparatus includes a rectangular bottom portion and a side wall portion arranged to extend upward from an outer circumferential portion of the bottom portion. The side wall portion includes four outside surfaces including a first outside surface and a second outside surface perpendicular or substantially perpendicular to the first outside surface. The first outside surface includes a first cutting base region. The second outside surface includes a second cutting base region. The bottom portion includes a bearing fixing portion arranged to fix a bearing mechanism of a motor arranged to rotate a disk.

22 Claims, 7 Drawing Sheets

HOUSING MEMBER FOR USE IN DISK DRIVE APPARATUS, MOTOR UNIT, DISK DRIVE APPARATUS, AND METHOD OF MANUFACTURING HOUSING MEMBER

BACKGROUND OF THE INVENTION

1. Field of the Invention

The present invention relates to a housing member and a method of manufacturing the same, and more specifically to a disk drive apparatus and a motor unit including the housing member.

2. Description of the Related Art

Aluminum die-cast housing members are often used in conventional disk drive apparatuses. For example, paragraphs [0011] and [0012] of JP-A 2009-245570 include a description as below: regarding a base produced by die casting an aluminum alloy, an inner surface of an outer wall of the base is subjected to a cutting process in order to have a desired small gap defined between an outer circumference of a magnetic disk and the inner surface of the outer wall of the base.

SUMMARY OF THE INVENTION

A housing member is provided with a bearing fixing portion to which a bearing mechanism of a motor is fixed. In order to determine, with high accuracy, the distance between a disk and a disk opposing side surface of the housing member (i.e., a surface of the housing member which is arranged opposite to an outer circumference of the disk), it is necessary to improve an accuracy of the relative position of the disk opposing side surface with respect to the bearing fixing portion. Meanwhile, in manufacture of the housing member, a cutting process for the disk opposing side surface and a cutting process for the bearing fixing portion are performed at separate times in separate steps. It is therefore not easy to improve the accuracy of the relative position of the disk opposing side surface with respect to the bearing fixing portion.

Accordingly, the present inventors have conducted a variety of studies and made various discoveries that have led to the development of preferred embodiments of the present invention described below.

A housing member for use in a disk drive apparatus according to a preferred embodiment of the present invention includes a rectangular bottom portion and a side wall portion arranged to extend upward from an outer circumferential portion of the bottom portion.

The bottom portion and the side wall portion are preferably molded by, for example, a die casting process as a single continuous monolithic member. The side wall portion preferably includes a partially cylindrical side surface arranged to be opposite to an outer circumference of a disk to be arranged inside the side wall portion. The partially cylindrical side surface is preferably arranged to be a portion of a cylindrical surface, defined inside the side wall portion by a cutting process, and is preferably coated with a coating agent.

The side wall portion preferably includes four outside surfaces including a first outside surface and a second outside surface perpendicular or substantially perpendicular to the first outside surface. The first outside surface includes a first cutting base region preferably defined by a cutting process and coated with the coating agent. The second outside surface includes a second cutting base region defined by a cutting process and coated with the coating agent.

The bottom portion preferably includes a bearing fixing portion defined in a center of the partially cylindrical side surface by a cutting process, and arranged to have a bearing mechanism of a motor arranged thereon.

A method of manufacturing a housing member for use in a disk drive apparatus according to a preferred embodiment of the present invention preferably includes the following steps a), b), c), d), e), and f). The disk drive apparatus includes a motor arranged to rotate a disk.

In step a), a rectangular bottom portion and a side wall portion arranged to extend upward from an outer circumferential portion of the bottom portion are defined by a die casting process as a single continuous monolithic workpiece. The side wall portion preferably includes four outside surfaces including a first outside surface and a second outside surface perpendicular or substantially perpendicular to the first outside surface.

In step b), a partially cylindrical side surface is defined inside the side wall portion by a cutting process. The partially cylindrical side surface is preferably arranged to be a portion of a cylindrical surface, and arranged to be opposite to an outer circumference of the disk.

In step c), a first cutting base region is defined in the first outside surface by a cutting process performed in parallel with step b).

In step d), a second cutting base region is defined in the second outside surface by a cutting process performed in parallel with steps b) and c).

In step e), each of the partially cylindrical side surface, the first cutting base region, and the second cutting base region is coated with a coating agent after steps b) to d).

In step f), a bearing fixing portion arranged to have a bearing mechanism of the motor arranged thereon is preferably defined in a center of the partially cylindrical side surface by a cutting process after step e), with the workpiece preferably being held using the first and second cutting base regions as positioning bases.

Thus, the preferred embodiments of the present invention are able to achieve an improvement in accuracy of the shape of a portion of a housing member which is defined by a cutting process.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that a vertical direction is defined as a direction in which a central axis of a motor extends in the accompanying figures, and that an upper side and a lower side along the vertical direction are referred to simply as an "upper side" and a "lower side", respectively. It should be noted, however, that the term "vertical direction" as used herein is not intended to mean a vertical direction with respect to gravity when the motor is actually installed in a device. It is also assumed herein that a circumferential direction about the central axis is simply referred to by the terms "circumferential direction", "circumferentially", "circumferential", etc., and that a radial direction centered on the central axis is simply referred to by the terms "radial direction", "radially", "radial", etc.

Figure 1:
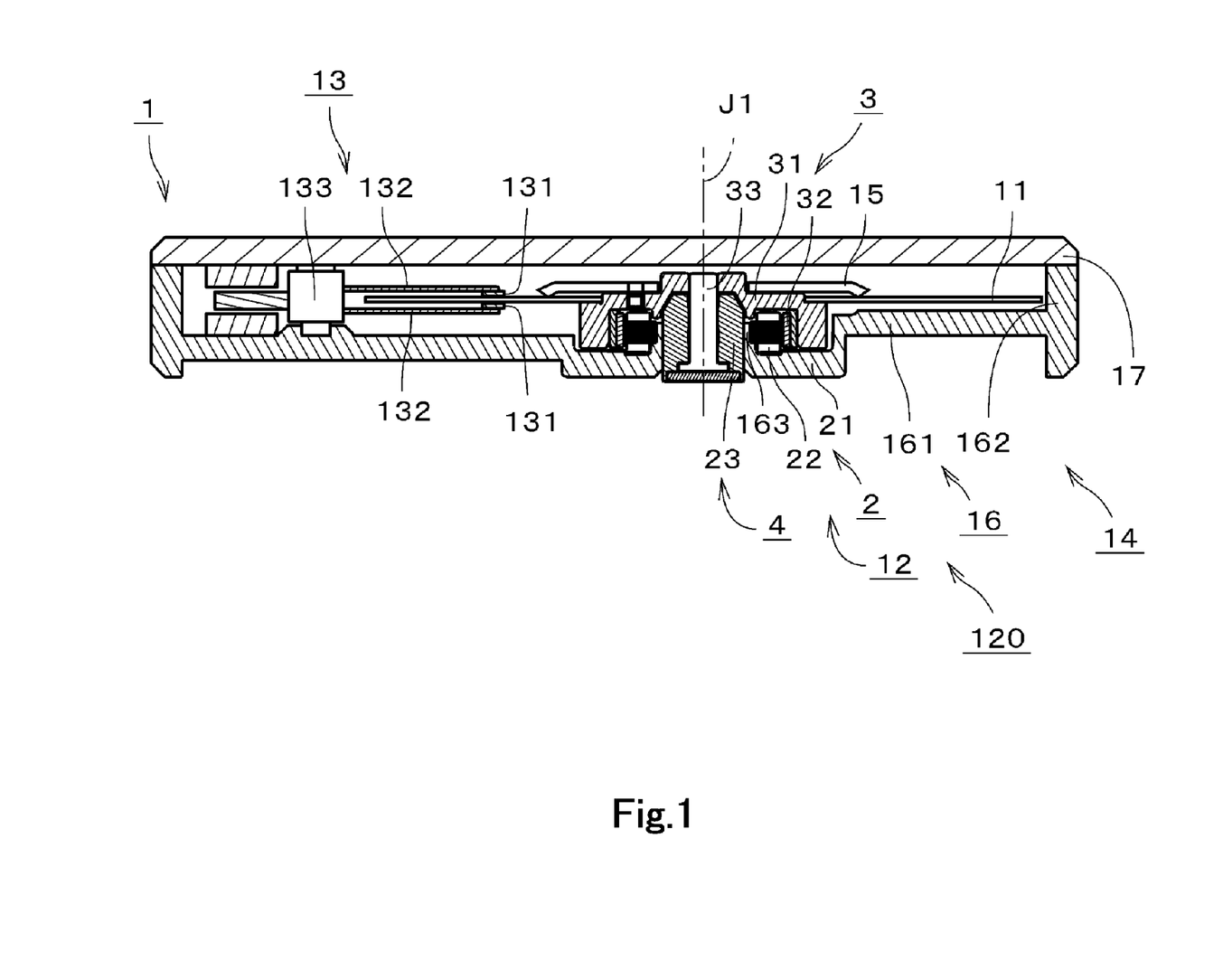
FIG. 1 is a cross-sectional view of a disk drive apparatus according to a preferred embodiment of the present invention.

FIG. 1 is a cross-sectional view of a disk drive apparatus 1 according to a preferred embodiment of the present invention, illustrating a cross-section of the disk drive apparatus 1 taken along a plane including a central axis J1 of a motor 12. The disk drive apparatus 1 is a so-called hard disk drive.

The disk drive apparatus 1 preferably includes, for example, a disk 11, the motor 12, an access portion 13, and a housing 14. The disk 11 is preferably in the shape of a circular plate, and is arranged to store information therein. The motor 12 is arranged to rotate while holding the disk 11. The access portion 13 is arranged to perform at least one of reading and writing of information from or to the disk 11. Note that two or more of such disks 11 may be held by the motor 12 if so desired. The disk 11, the motor 12, and the access portion 13 are contained in the housing 14. Note that the access portion 13 may be arranged to perform either only one or both of the reading and the writing of information from or to the disk 11 if so desired.

The housing 14 preferably includes a cup-shaped housing member 16 and a plate-shaped housing cover portion 17. The housing member 16 preferably includes a bottom portion 161 and a side wall portion 162. The bottom portion 161 is arranged substantially in the shape of a rectangle in a plan view. The side wall portion 162 is arranged to extend upward from an outer circumferential portion of the bottom portion 161. The housing cover portion 17 is preferably arranged to be fixed to a top of the side wall portion 162 of the housing member 16 through screws or by another method, for example, to close an upper opening of the housing member 16. The housing 14 is thereby defined as a result. An interior space of the housing 14 is preferably hermetically enclosed, and is arranged to contain either no or extremely little dirt or dust. An interior of the housing 14 is preferably filled with a helium gas.

The disk 11 is arranged to be clamped by a clamper 15 and the motor 12. The access portion 13 preferably includes two heads 131, two arms 132, and a head actuator mechanism 133. It should be noted that any other desirable number of heads 131, arms 132, and head actuator mechanisms 133 could be used instead. Each of the two arms 132 is arranged to support a separate one of the two heads 131. Each head 131 is arranged to perform at least one of the reading and the writing of information from or to the disk 11. The head actuator mechanism 133 is arranged to actuate each arm 132 to move an associated one of the heads 131 relative to the disk 11. The above arrangement enables each head 131 to make access to a desired location on the disk 11 while being arranged in close proximity to the rotating disk 11, to perform at least one of the reading and the writing of information.

The motor 12 is preferably an outer-rotor motor. The motor 12 includes a stationary portion 2 and a rotating portion 3. The rotating portion 3 is supported through a bearing mechanism 4 to be rotatable about the central axis J1 of the motor 12 with respect to the stationary portion 2. The central axis J1 of the motor 12 is arranged to coincide with central axes of both the stationary portion 2 and the rotating portion 3 and also with a central axis of the bearing mechanism 4.

The stationary portion 2 preferably includes a base portion 21, a stator 22, and a sleeve portion 23. The base portion 21 is a portion of the housing member 16. In other words, the motor 12 and the housing member 16 share a portion of each other. The motor 12 and the housing member 16 together define a motor unit 120 of the disk drive apparatus 1. The base portion 21 is provided with a bearing fixing portion 163. The bearing fixing portion 163 is preferably substantially cylindrical and centered on the central axis J1. The stator 22 is arranged around the bearing fixing portion 163. The sleeve portion 23, which is preferably substantially cylindrical and has a bottom, is fixed to an inner hole portion of the bearing fixing portion 163 preferably through, for example, an adhesive or by another method.

The rotating portion 3 preferably includes a rotor hub 31, a rotor magnet 32, and a shaft 33. The rotor magnet 32 is arranged radially opposite the stator 22 to produce a torque between the stator 22 and the rotor magnet 32. The shaft 33 is substantially columnar and is inserted in the sleeve portion 23. A gap defined between the shaft 33 and the sleeve portion 23 is filled with a lubricating oil.

While the motor 12 is driven, a fluid dynamic pressure is generated by the lubricating oil provided in the gap between the shaft 33 and the sleeve portion 23. The shaft 33 is supported thereby such that the shaft 33 is rotatable with respect to the sleeve portion 23. The sleeve portion 23, the shaft 33, and the lubricating oil together define the bearing mechanism 4 of the motor 12.

Figure 2:
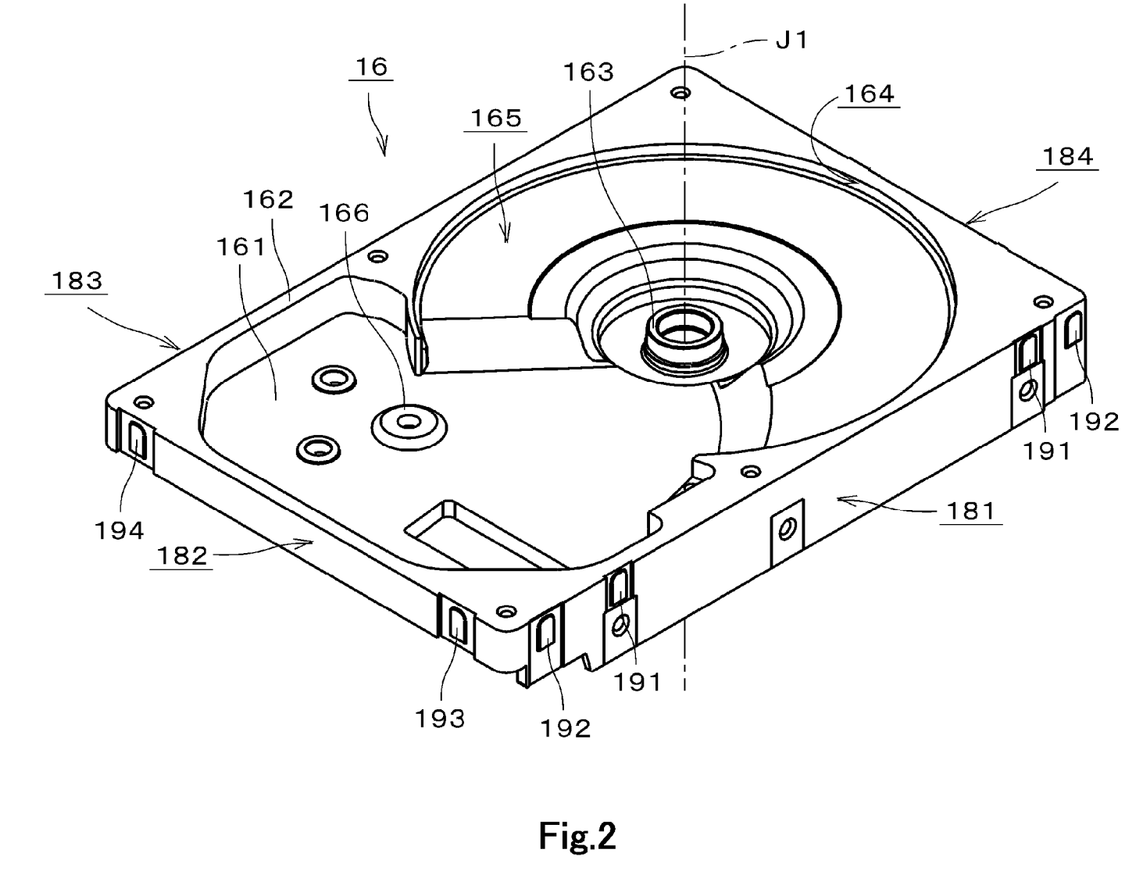
FIG. 2 is a perspective view of a housing member according to a preferred embodiment of the present invention.
Figure 3:
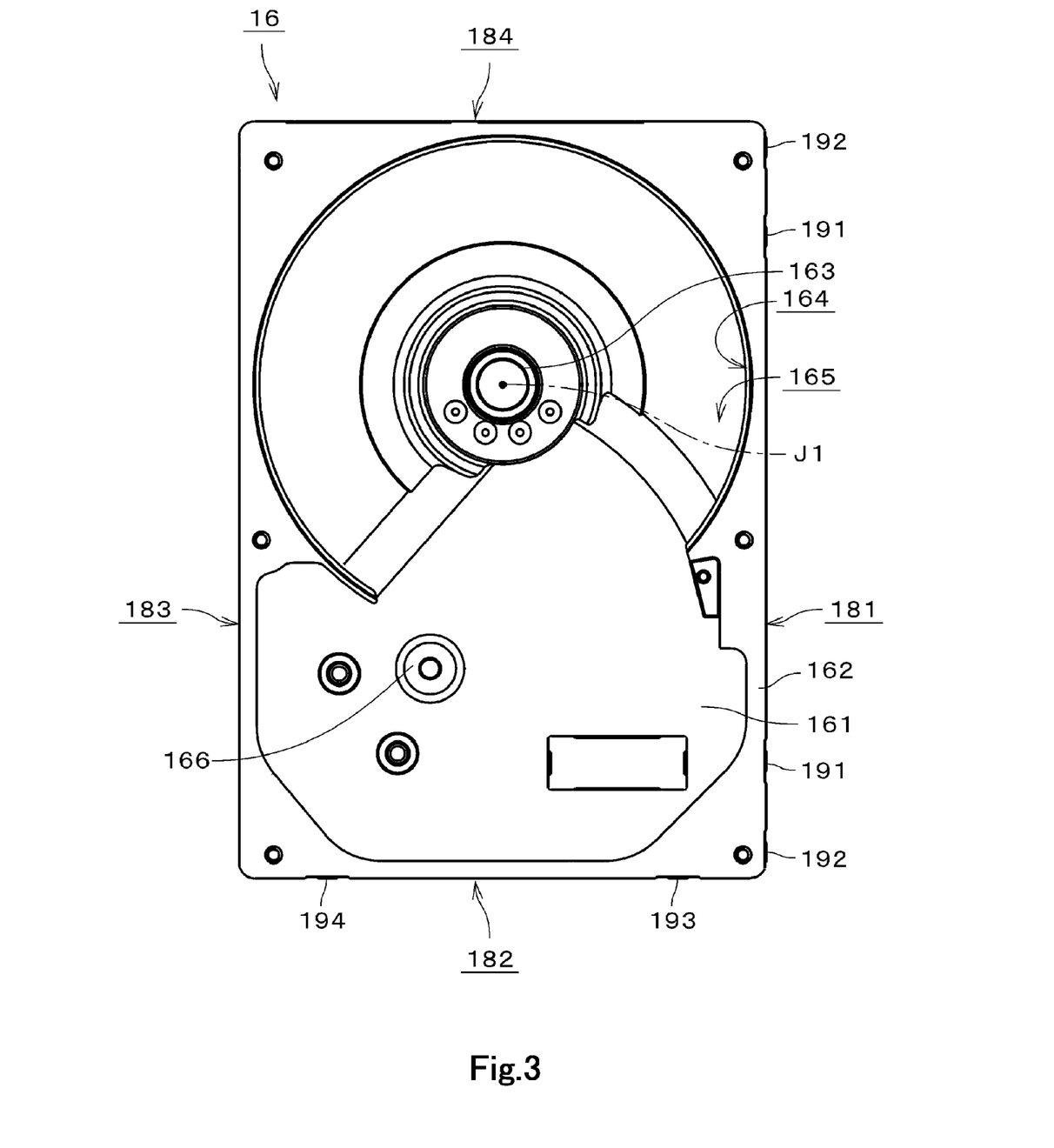
FIG. 3 is a plan view of the housing member.

FIG. 2 is a perspective view of the housing member 16. FIG. 3 is a plan view of the housing member 16. The housing member 16 is preferably made of a metal such as, for example, aluminum or an aluminum alloy. The bottom portion 161 and the side wall portion 162 of the housing member 16 are preferably molded by, for example. a die casting process as a single continuous monolithic member.

The side wall portion 162 includes a partially cylindrical side surface 164. The partially cylindrical side surface 164 is a portion of an inside surface of the side wall portion 162. The partially cylindrical side surface 164 is arranged in the shape of a portion of a cylindrical surface and centered on the central axis J1. The partially cylindrical side surface 164 is arranged to be opposite to an outer circumference of the disk 11, which is to be arranged inside the partially cylindrical side surface 164. The partially cylindrical side surface 164 is defined inside the side wall portion 162 by a cutting process, and is preferably coated with a coating agent through, for example, electrodeposition coating. Note that the above coating using the coating agent is not limited to the electrodeposition coating, but may alternatively be accomplished through spray coating or the like, for example. This is also true of coating of other portions which will be described below as being accomplished through the electrodeposition coating.

The bottom portion 161 preferably includes the bearing fixing portion 163, a disk opposing bottom surface 165, and a head actuator mechanism fixing portion 166. The bearing fixing portion 163 is arranged to fix the bearing mechanism 4 of the motor 12 as described above. The bearing fixing portion 163 is defined in a center of the partially cylindrical side surface 164 by a cutting process. The disk opposing bottom surface 165 is a portion of an upper surface of the bottom portion 161. The disk opposing bottom surface 165 is a portion of a substantially annular surface centered on the central axis J1. The disk opposing bottom surface 165 is arranged to be opposite to a lower surface of the disk 11, which is to be arranged above the disk opposing bottom surface 165. The disk opposing bottom surface 165 is defined by a cutting process, and is coated with the coating agent through electrodeposition coating. The head actuator mechanism fixing portion 166 is substantially cylindrical, and is arranged to fix the head actuator mechanism 133 of the access portion 13. The head actuator mechanism fixing portion 166 is defined by a cutting process at a position away from the partially cylindrical side surface 164 and the disk opposing bottom surface 165.

Of four outside surfaces of the side wall portion 162, an outside surface that is on the right-hand side at the front in FIG. 2 will be hereinafter referred to as a "first outside surface 181", and an outside surface that is on the left-hand side at the front in FIG. 2 will be hereinafter referred to as a "second outside surface 182". Moreover, an outside surface parallel or substantially parallel to the first outside surface 181 will be hereinafter referred to as a "third outside surface 183", and an outside surface parallel or substantially parallel to the second outside surface 182 will be hereinafter referred to as a "fourth outside surface 184". As illustrated in FIGS. 2 and 3, the length of each of the first and third outside surfaces 181 and 183, i.e., the dimension thereof in a horizontal direction, is preferably greater than that of each of the second and fourth outside surfaces 182 and 184. Each of the first and third outside surfaces 181 and 183 is arranged to be perpendicular or substantially perpendicular to each of the second and fourth outside surfaces 182 and 184.

The first outside surface 181 preferably includes two first die-cast base regions 191 and two first cutting base regions 192. Each of the first die-cast base regions 191 and the first cutting base regions 192 is a top surface of a raised portion that is arranged to project sideways relative to a surrounding region, and is arranged in parallel or substantially in parallel with the first outside surface 181. In the present preferred embodiment, each one of the first cutting base regions 192 is arranged in the vicinity of a separate longitudinal end of the first outside surface 181, while the two first die-cast base regions 191 are arranged between the two first cutting base regions 192. Each of the two first die-cast base regions 191 is preferably defined by the die casting process together with the bottom portion 161 and the side wall portion 162, and is preferably coated with the coating agent through, for example, electrodeposition coating. Each of the two first cutting base regions 192 is preferably defined by a cutting process, and is preferably coated with the coating agent through, for example, electrodeposition coating.

The second outside surface 182 includes a second die-cast base region 193 and a second cutting base region 194. Each of the second die-cast base region 193 and the second cutting base region 194 is a top surface of a raised portion that is arranged to project sideways relative to a surrounding region, and is arranged in parallel or substantially in parallel with the second outside surface 182. In the present preferred embodiment, the second die-cast base region 193 is arranged in the vicinity of a longitudinal end of the second outside surface 182 on a side closer to the first outside surface 181, while the second cutting base region 194 is arranged in the vicinity of an opposite longitudinal end of the second outside surface 182. The second die-cast base region 193 is preferably defined by the die casting process together with the bottom portion 161 and the side wall portion 162, and is preferably coated with the coating agent through, for example, electrodeposition coating. The second cutting base region 194 is preferably defined by a cutting process, and is preferably coated with the coating agent through, for example, electrodeposition coating.

Figure 4:
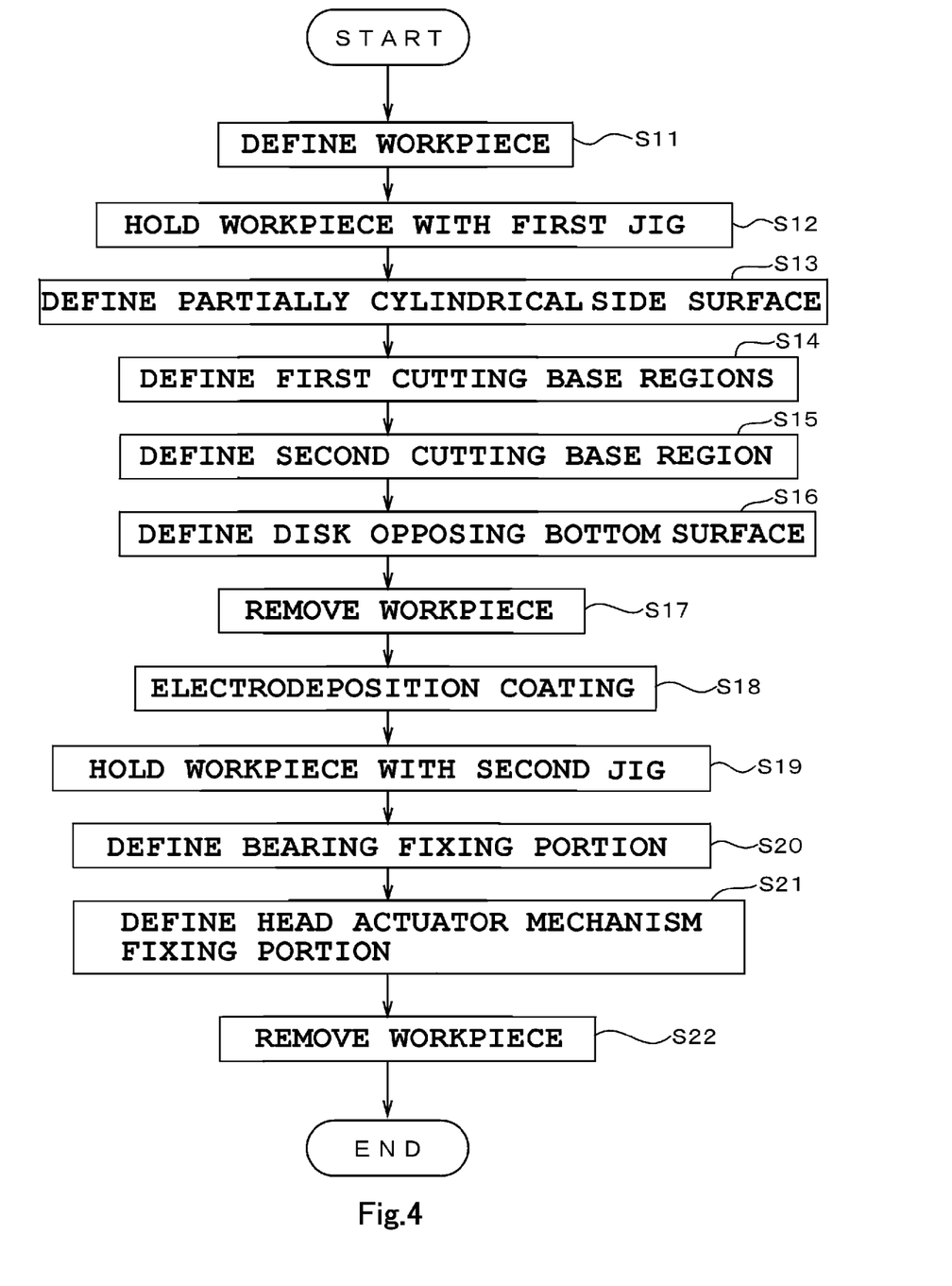
FIG. 4 is a flowchart illustrating a procedure of manufacturing the housing member according to a preferred embodiment of the present invention.

Next, referring to FIG. 4, a procedure of manufacturing the housing member 16 will now be described below. When the housing member 16 is produced, first, the metal which is a material of the housing member 16, e.g., aluminum or an aluminum alloy, is injected in a molten state into an interior space of a mold. Then, after the metal is solidified, the solid metal is separated from the mold to obtain a workpiece 5 (shown, for example, in FIG. 5) that is to become the housing member 16. The workpiece 5 preferably includes the bottom portion 161 and the side wall portion 162 described above. In other words, the bottom portion 161 and the side wall portion 162 are defined by the die casting process as a single continuous monolithic member (step S11).

Figure 5:
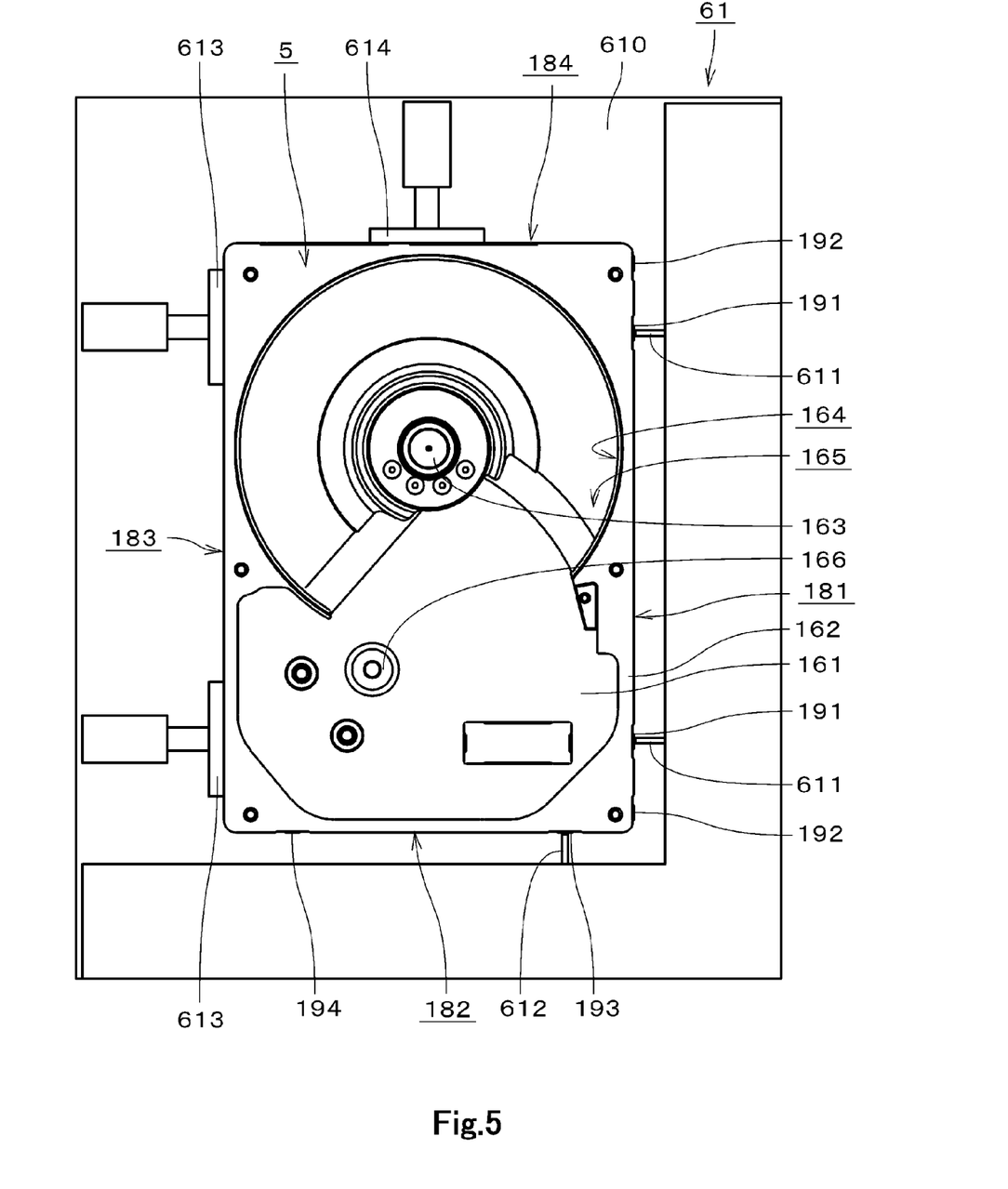
FIG. 5 is a plan view of a workpiece and a first jig according to a preferred embodiment of the present invention.

FIG. 5 is a plan view illustrating the workpiece 5 and a first jig 61 arranged to hold the workpiece 5. In step S11, a portion that is to become the above-described bearing fixing portion 163, a surface that is to become the disk opposing bottom surface 165, and a portion that is to become the head actuator mechanism fixing portion 166 are preferably defined in the bottom portion 161 of the workpiece 5. A surface that is to become the partially cylindrical side surface 164 is defined inside the side wall portion 162. In FIG. 5, the above portions and surfaces are shown as having the same shapes and are denoted by the same reference numerals as those of the bearing fixing portion 163, the disk opposing bottom surface 165, the head actuator mechanism fixing portion 166, and the partially cylindrical side surface 164, respectively. Moreover, in step S11, the two first die-cast base regions 191 are preferably defined in the first outside surface 181 of the side wall portion 162, and the second die-cast base region 193 is preferably defined in the second outside surface 182.

After the workpiece 5 is defined, the workpiece 5 is held by the first jig 61 (step S12). The first jig 61 preferably includes a jig body 610, two first pins 611, one second pin 612, first bias mechanisms 613, and a second bias mechanism 614. Each first pin 611 is arranged to project in the horizontal direction from the jig body 610 toward the first outside surface 181 of the side wall portion 162 of the workpiece 5. A top of each of the two first pins 611 is preferably arranged in contact with a separate one of the two first die-cast base regions 191 of the workpiece 5. The second pin 612 is arranged to project in the horizontal direction from the jig body 610 toward the second outside surface 182 of the side wall portion 162 of the workpiece 5. A top of the second pin 612 is arranged in contact with the second die-cast base region 193 of the workpiece 5. Each of the first and second bias mechanisms 613 and 614 is preferably, for example, an air cylinder arranged to be movable in the horizontal direction. The first bias mechanisms 613 are brought into contact with the third outside surface 183 of the side wall portion 162 to bias the workpiece 5 toward the first pins 611. The second bias mechanism 614 is brought into contact with the fourth outside surface 184 of the side wall portion 162 to bias the workpiece 5 toward the second pin 612.

Although not shown in FIG. 5, the first jig 61 preferably further includes three pins arranged to support the bottom portion 161 of the workpiece 5 from below, and a bias mechanism arranged to bias the workpiece 5 toward these three pins. The first jig 61 is arranged to hold the bottom portion 161 and the side wall portion 162 of the workpiece 5 through the above-described mechanisms arranged to hold the workpiece 5 from both sides in each of the horizontal and vertical directions, with the two first die-cast base regions 191 and the second die-cast base region 193 used as positioning bases.

Next, in a situation in which the workpiece 5 is held by the first jig 61, the surface that is to become the partially cylindrical side surface 164 of the side wall portion 162 is subjected to the cutting process using a cutting tool, so that the partially cylindrical side surface 164 is defined inside the side wall portion 162 (step S13). In addition, the first outside surface 181 of the side wall portion 162 is subjected to the cutting process to define the two first cutting base regions 192 in the first outside surface 181 (step S14). The second outside surface 182 of the side wall portion 162 is subjected to the cutting process to define the second cutting base region 194 (step S15). Furthermore, the surface that is to become the disk opposing bottom surface 165 of the bottom portion 161 is subjected to the cutting process to define the disk opposing bottom surface 165 in the bottom portion 161 (step S16). The cutting processes of steps S13 to S16 are preferably performed by using the same cutting tool.

After the cutting processes of steps S13 to S16 are completed, the workpiece 5 is removed from the first jig 61 (step S17). In manufacturing the housing member 16, steps S13 to S16 may be performed in any appropriate order as long as steps S13 to S16 are performed while the workpiece 5 is held by the first jig 61. In short, steps S13 to S16 are in essence performed in parallel with one another while the workpiece 5 is held by the same jig, in this case, the first jig 61. In the above-described illustrative procedure, steps S13 to S16 are in essence preferably performed in parallel with one another. Note that, in the manufacture of the housing member 16, two or more steps among steps S13 to S16 may be performed simultaneously by using a plurality of cutting tools.

Next, the workpiece 5 is preferably subjected to a cleaning process and electrodeposition coating, so that a surface of the workpiece 5 is coated with the coating agent through the electrodeposition coating (step S18). The surface of the workpiece 5 which is coated with the coating agent through the electrodeposition coating includes the partially cylindrical side surface 164, the disk opposing bottom surface 165, the two first die-cast base regions 191, the second die-cast base region 193, the two first cutting base regions 192, and the second cutting base region 194. The portion that is to become the bearing fixing portion 163 and the portion that is to become the head actuator mechanism fixing portion 166 are also preferably coated with the coating agent through, for example, the electrodeposition coating.

Figure 6:
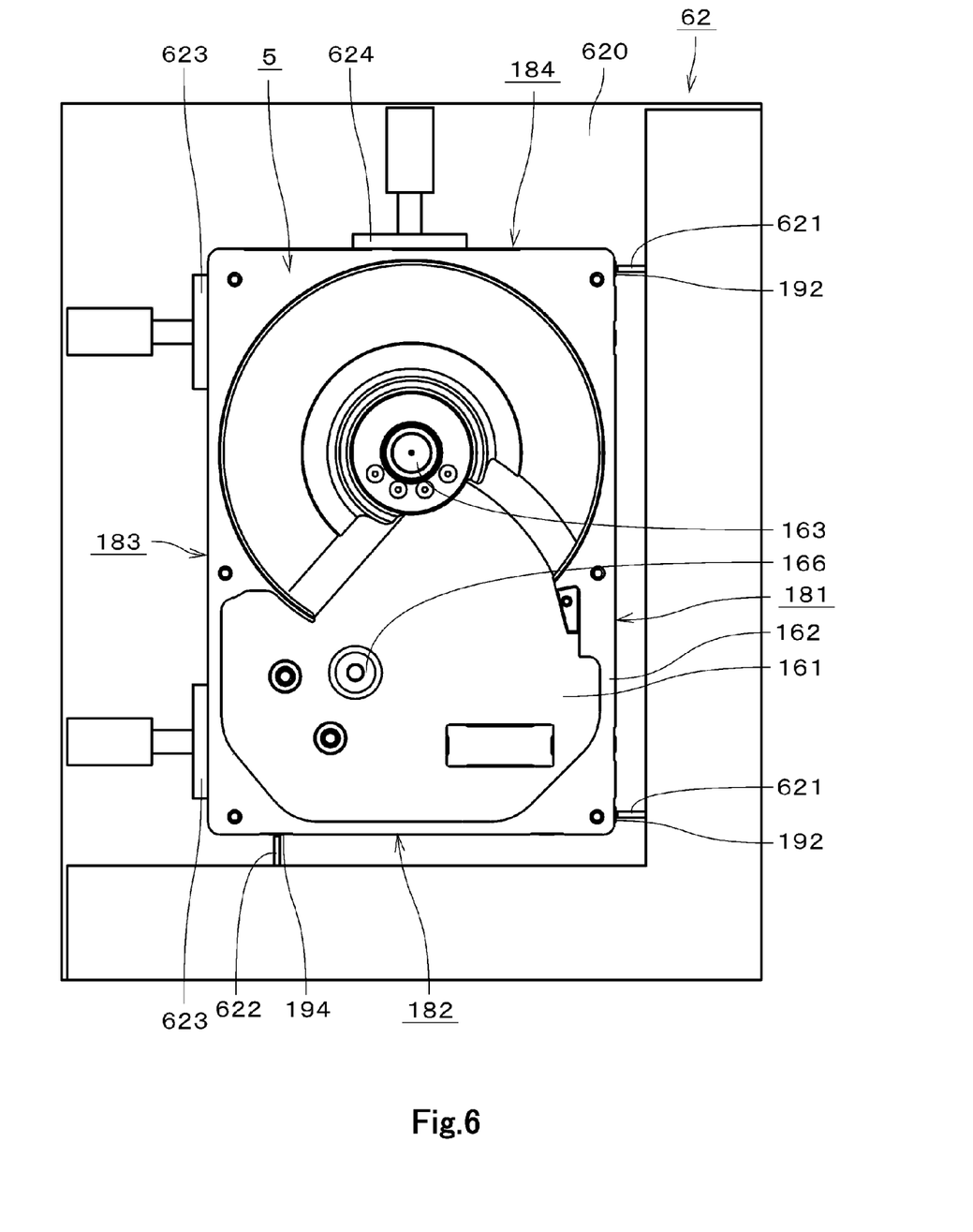
FIG. 6 is a plan view of the workpiece and a second jig according to a preferred embodiment of the present invention.

After the electrodeposition coating is completed, the workpiece 5 is arranged to be held by a second jig 62 as illustrated in FIG. 6 (step S19). Similarly to the first jig 61, the second jig 62 preferably includes a jig body 620, two first pins 621, one second pin 622, first bias mechanisms 623, and a second bias mechanism 624. Each first pin 621 is arranged to project in the horizontal direction from the jig body 620 toward the first outside surface 181 of the side wall portion 162 of the workpiece 5. A top of each of the two first pins 621 is preferably arranged in contact with a separate one of the two first cutting base regions 192 of the workpiece 5. The second pin 622 is arranged to project in the horizontal direction from the jig body 620 toward the second outside surface 182 of the side wall portion 162 of the workpiece 5. A top of the second pin 622 is arranged in contact with the second cutting base region 194 of the workpiece 5. Each of the first and second bias mechanisms 623 and 624 is preferably, for example, an air cylinder arranged to be movable in the horizontal direction. The first bias mechanisms 623 are brought into contact with the third outside surface 183 of the side wall portion 162 to bias the workpiece 5 toward the first pins 621. The second bias mechanism 624 is brought into contact with the fourth outside surface 184 of the side wall portion 162 to bias the workpiece 5 toward the second pin 622.

Although not shown in FIG. 6, as with the first jig 61, the second jig 62 further preferably includes three pins arranged to support the bottom portion 161 of the workpiece 5 from below, and a bias mechanism arranged to bias the workpiece 5 toward these three pins. The second jig 62 is arranged to hold the bottom portion 161 and the side wall portion 162 of the workpiece 5 through the above-described mechanisms arranged to hold the workpiece 5 from both sides in each of the horizontal and vertical directions, with the two first cutting base regions 192 and the second cutting base region 194 used as the positioning bases.

Next, in a situation in which the workpiece 5 is held by the second jig 62, the portion that is to become the bearing fixing portion 163 of the bottom portion 161 is subjected to the cutting process using a cutting tool. As a result of this cutting process, a portion of the coating agent is removed from this portion, and this portion is formed into a predetermined shape to define the bearing fixing portion 163 (step S20). In addition, the portion that is to become the head actuator mechanism fixing portion 166 of the bottom portion 161 is subjected to the cutting process, so that a portion of the coating agent is removed from this portion, and the head actuator mechanism fixing portion 166 is defined (step S21). The manufacture of the housing member 16 is thereby completed. The cutting processes of steps S20 and S21 are preferably performed by using the same cutting tool.

Because a surface of the bearing fixing portion 163 is not coated with the coating agent as described above, an error in attachment of the bearing mechanism 4 due to slight unevenness of the thickness of the coating agent can be avoided. This makes it possible to fix the bearing mechanism 4 to the housing member 16 with high accuracy. Moreover, an electrical connection between the motor 12 and the housing member 16 can be established to prevent the disk 11 from becoming charged with electricity, for example. In addition, a surface of the head actuator mechanism fixing portion 166 is also preferably not coated with the coating agent. This makes it possible to fix the access portion 13 to the housing member 16 with high accuracy.

After the cutting processes of steps S20 and S21 are completed, the housing member 16 is removed from the second jig (step S22). Note that, in the manufacture of the housing member 16, step S21 may be performed before step S20 if so desired, so long as steps S20 and S21 are performed while the workpiece 5 is held by the second jig 62. Also note that, in the manufacture of the housing member 16, steps S20 and S21 may be performed simultaneously by using a plurality of cutting tools.

Each of the two first die-cast base regions 191 and the second die-cast base region 193 is preferably defined by the die casting process, and is therefore is preferably arranged to include a sloping surface to facilitate removal of the mold. Moreover, each of the first die-cast base regions 191 and the second die-cast base region 193 may be slightly uneven. Therefore, it is not easy to bring the first pins 621 and the second pin 622 of the second jig 62 into contact with the first die-cast base regions 191 and the second die-cast base region 193, respectively, at exactly the same positions as those at which the first pins 611 and the second pin 612 of the first jig 61 have been brought into contact with the first die-cast base regions 191 and the second die-cast base region 193, respectively.

Therefore, if the workpiece 5 were held by the second jig 62 at step S19 by using the two first die-cast base regions 191 and the second die-cast base region 193 as the positioning bases, the workpiece 5 held by the second jig 62 at step S19 might be displaced from the workpiece 5 held by the first jig 61 at step S12 due to effects of the slope and unevenness of each of the first and second die-cast base regions 191 and 193 combined with differences in the pin contact positions.

In contrast, in the manufacture of the housing member 16 according to the present preferred embodiment, the workpiece 5 is held by the second jig 62 at step S19 by using the first and second cutting base regions 192 and 194 as the positioning bases as described above. Each of the first cutting base regions 192 is defined by the cutting process as a surface parallel or substantially in parallel with the central axis J1 and perpendicular or substantially perpendicular to the corresponding first pin 621. The second cutting base region 194 is defined by the cutting process as a surface in parallel or substantially in parallel with the central axis J1 and perpendicular or substantially perpendicular to the second pin 622. In addition, each of the first and second cutting base regions 192 and 194 is defined more smoothly and with a greater accuracy in shape than each of the first and second die-cast base regions 191 and 193. Therefore, an effect of differences in the pin contact positions between the first and second jigs 61 and 62 can be avoided. This contributes to preventing the workpiece 5 held by the second jig 62 from being displaced with respect to the workpiece 5 held by the first jig 61. The arithmetic mean roughness of each of the first and second cutting base regions 192 and 194 is preferably smaller than that of each of the first and second die-cast base regions 191 and 193.

In an actual place for manufacture, a plurality of housing members 16 are manufactured in parallel with one another, and preferably a plurality of second jigs 62 are used accordingly. According to the above-described method of manufacturing the housing member 16, even if the first pins 621 of different second jigs 62 are slightly displaced from each other in the vertical direction, for example, an effect of this displacement can be avoided, and a displacement between the workpieces 5 held by different second jigs 62 can also preferably be avoided.

In the manufacture of the housing member 16, the first and second cutting base regions 192 and 194 are defined in parallel or substantially in parallel with the definition of the partially cylindrical side surface 164. Therefore, the relative position of the partially cylindrical side surface 164 with respect to each of the first and second cutting base regions 192 and 194 is preferably determined with high accuracy. Moreover, because the bearing fixing portion 163 is defined in a situation in which the workpiece 5 is held using the first and second cutting base regions 192 and 194 as the positioning bases, the relative position of the bearing fixing portion 163 with respect to each of the first and second cutting base regions 192 and 194 is also determined with high accuracy. Therefore, the relative position of the partially cylindrical side surface 164 with respect to the bearing fixing portion 163 is also determined with high accuracy. As a result, a central axis of the bearing fixing portion 163 and a central axis of the partially cylindrical side surface 164 coincide with each other with high accuracy.

Furthermore, because the head actuator mechanism fixing portion 166 is defined in the situation in which the workpiece 5 is held using the first and second cutting base regions 192 and 194 as the positioning bases, the relative position of the head actuator mechanism fixing portion 166 with respect to the bearing fixing portion 163 is determined with improved accuracy. As a result, the relative position of the access portion 13 with respect to each of the motor 12 and the disk 11 in the disk drive apparatus 1 is preferably determined with improved accuracy.

An improvement in accuracy of the shape of portions of the housing member 16 which are defined by the cutting processes is achieved by performing the cutting processes using the first and second cutting base regions 192 and 194, each of which has a great accuracy in shape, as described above.

Each of the first and second cutting base regions 192 and 194 is the top surface of the raised portion arranged to project sideways relative to the surrounding region as described above. Therefore, it is easy to identify the position of each of the first and second cutting base regions 192 and 194. Moreover, it is easy to define each of the first and second cutting base regions 192 and 194 by the cutting process.

In the housing member 16, the two first cutting base regions 192 are defined in the first outside surface 181, which is longer than the second outside surface 182. This makes it possible to increase the distance between the two first cutting base regions 192. This preferably contributes to increasing accuracy with which the housing member 16 is positioned when the housing member 16 is manufactured and when the disk drive apparatus 1 is assembled. This preferably contributes to a greater accuracy of the shape of the housing member 16, and also to an improved accuracy in assembling the disk drive apparatus 1.

In the manufacture of the housing member 16, the cutting processes of steps S13 to S16 are preferably performed by using the same cutting tool. This makes it possible to perform the cutting processes of steps S13 to S16 quickly and with high accuracy, and also to define the partially cylindrical side surface 164 and the disk opposing bottom surface 165 with high accuracy in shape by the cutting processes.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

For example, the two first cutting base regions 192 may be defined between the two first die-cast base regions 191 in the first outside surface 181 of the housing member 16. In this case, both end portions of a single long and narrow region defined by a cutting process and extending in a longitudinal direction of the first outside surface 181 may preferably be arranged to serve as the two first cutting base regions 192. Each of the first and second die-cast base regions 191 and 193 may not necessarily be defined distinctly. Portions of the first outside surface 181 and a portion of the second outside surface 182 may be used as the first die-cast base regions 191 and the second die-cast base region 193, respectively.

Each of the two first cutting base regions 192 and the second cutting base region 194 defined at steps S14 and S15, respectively, may preferably be a bottom surface of a recessed portion which is recessed relative to the surrounding region. This allows the position of each of the first and second cutting base regions 192 and 194 to be identified easily, and also preferably contributes to preventing each of the first and second cutting base regions 192 and 194 from colliding with the jig or the like and suffering from damage in later steps starting with step S18. Also note that each of the first and second cutting base regions 192 and 194 may be arranged to be substantially flush with the surrounding region. Each of the first bias mechanisms 613 and 623 and the second bias mechanisms 614 and 624 is not limited to the air cylinder, but may be any of a variety of other mechanisms.

As with the partially cylindrical side surface 164 and so on, the head actuator mechanism fixing portion 166 may be defined by a cutting process in the situation in which the workpiece 5 is held by the first jig 61, and thereafter coated with the coating agent through electrodeposition coating. If a cutting oil used in the cutting process remains on the head actuator mechanism fixing portion 166 even after the cleaning process, the cutting oil may become vaporized to generate a gas. It is possible to prevent such a gas from being generated from the head actuator mechanism fixing portion 166 by defining the head actuator mechanism fixing portion 166 by the cutting process and thereafter coating the head actuator mechanism fixing portion 166 with the coating agent through, for example, the electrodeposition coating.

Figure 7:
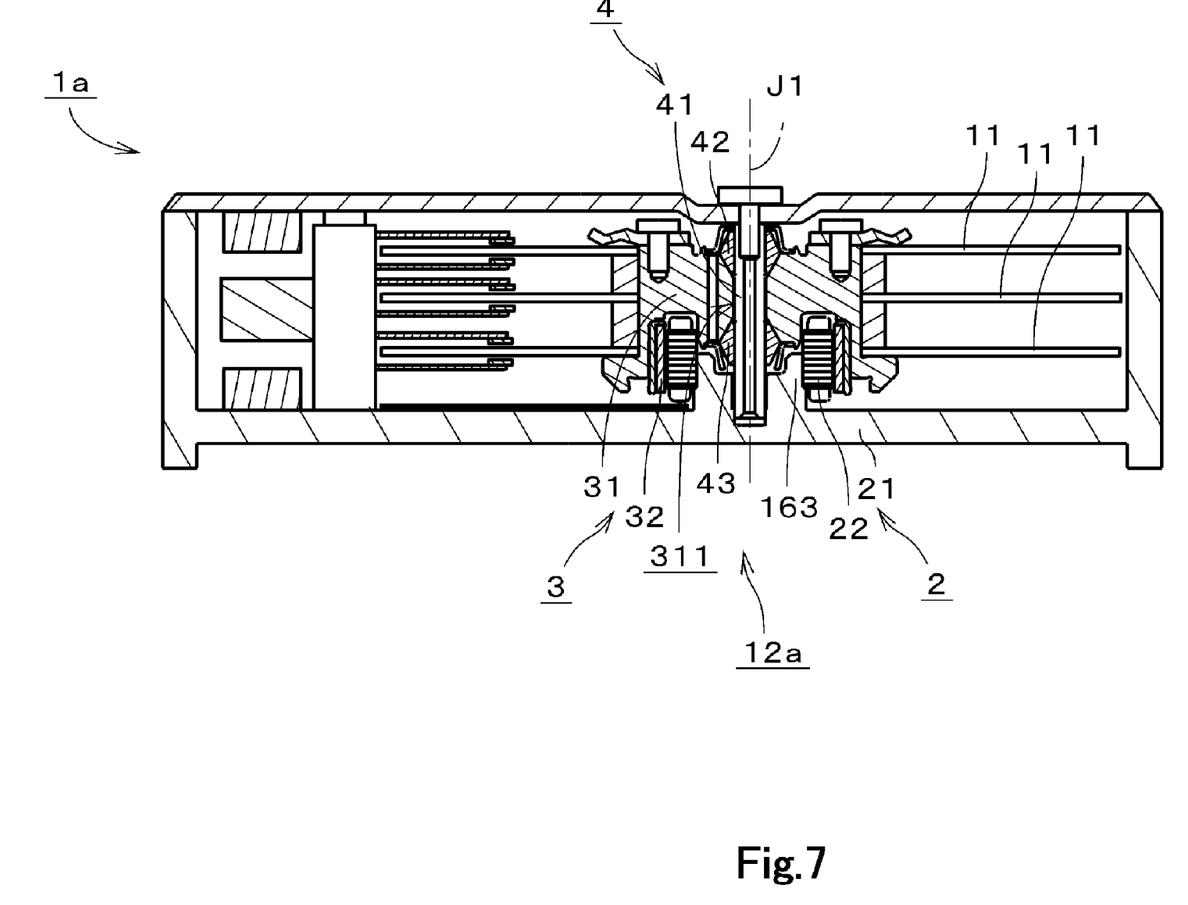
FIG. 7 is a cross-sectional view of a disk drive apparatus according to another preferred embodiment of the present invention.

Note that the specific structure of the motor 12 according to the above-described preferred embodiment is not essential to the present invention, and that the structure of the motor may be modified in a variety of ways in other preferred embodiments of the present invention. FIG. 7 is a cross-sectional view of a disk drive apparatus 1a according to a preferred embodiment of the present invention. The disk drive apparatus 1a includes a motor 12a arranged to hold, for example, three disks 11. The motor 12a includes a stationary portion 2, a rotating portion 3, and a bearing mechanism 4. The stationary portion 2 includes a base portion 21 and a stator 22. The stator is preferably fixed to a circumference of a bearing fixing portion 163 of the base portion 21. The bearing fixing portion 163 includes a recessed portion having an upward opening. The rotating portion 3 preferably includes a rotor hub 31 and a rotor magnet 32. An axially extending hole portion 311 is defined in a center of the rotor hub 31.

The bearing mechanism 4 preferably includes a shaft 41, a first cone portion 42, and a second cone portion 43. The shaft 41 is arranged to be inserted in the hole portion 311 of the rotor hub 31. The shaft 41 is preferably arranged to be fixed to an inner hole portion of the bearing fixing portion 163, so that the shaft 41 remains stationary while being oriented in the vertical direction along a central axis J1. Each of the first and second cone portions 42 and 43 is fixed to the shaft 41. While the motor 12a is driven, a fluid dynamic pressure is generated through lubricating oil in a gap defined between the rotor hub 31 and each of the first and second cone portions 42 and 43. The rotor hub 31 is thereby supported to be rotatable with respect to the shaft 41.

Features of the above-described preferred embodiments and the modifications thereof may be combined appropriately as long as no conflict arises.

Housing members according to preferred embodiments of the present invention can be used in a variety of disk drive apparatuses.

What is claimed is:

1. A housing member for use in a disk drive apparatus including a motor arranged to rotate a disk, the housing member comprising:
a rectangular or substantially rectangular bottom portion; and
a side wall portion arranged to extend upward from an outer circumferential portion of the bottom portion; wherein
the bottom portion and the side wall portion are defined by a single continuous monolithic member;
the side wall portion includes a partially cylindrical side surface arranged to be opposite to an outer circumference of the disk arranged inside the side wall portion, the partially cylindrical side surface being arranged in a shape of a portion of a cylindrical surface, defined inside the side wall portion by a cutting process, and coated with a coating agent;
the side wall portion includes four outside surfaces including a first outside surface and a second outside surface perpendicular or substantially perpendicular to the first outside surface;
the first outside surface includes a first cutting base region defined by a cutting process and coated with the coating agent;
the second outside surface includes a second cutting base region defined by a cutting process and coated with the coating agent; and
the bottom portion includes a bearing fixing portion defined in a center of the partially cylindrical side surface by a cutting process, and arranged to have a bearing mechanism of the motor arranged thereon.

2. The housing member according to claim 1, wherein each of the first and second cutting base regions is a top surface of a raised portion arranged to project sideways relative to a surrounding region.

3. The housing member according to claim 1, wherein each of the first and second cutting base regions is a bottom surface of a recessed portion which is recessed relative to a surrounding region.

4. The housing member according to claim 1, wherein the first outside surface has a length greater than a length of the second outside surface.

5. The housing member according to claim 1, wherein a number of the first cutting base regions defined in the first outside surface is at least two.

6. The housing member according to claim 1, wherein
the first outside surface further includes a first die-cast base region defined by the die casting process together with the side wall portion, and coated with the coating agent; and
the second outside surface further includes a second die-cast base region defined by the die casting process together with the side wall portion, and coated with the coating agent.

7. The housing member according to claim 6, wherein each of the first and second cutting base regions has an arithmetic mean roughness smaller or substantially smaller than an arithmetic mean roughness of each of the first and second die-cast base regions.

8. The housing member according to claim 6, wherein a number of the first die-cast base regions defined in the first outside surface is at least two.

9. The housing member according to claim 8, wherein
a number of first cutting base regions defined in the first outside surface is at least two; and
the at least two first die-cast base regions are defined between the at least two first cutting base regions in the first outside surface.

10. A motor unit for use in a disk drive apparatus, the motor unit comprising:
the housing member of claim 1;
a stationary portion; and
a rotating portion supported through the bearing mechanism to be rotatable with respect to the stationary portion.

11. A disk drive apparatus comprising:
the motor unit of claim 10 arranged to rotate a disk;
an access portion arranged to perform at least one of reading and writing of information from or to the disk; and
a housing cover portion fixed to a top of the side wall portion of the housing member to close an upper opening of the housing member.

12. A method of manufacturing a housing member for use in a disk drive apparatus including a motor arranged to rotate a disk, the method comprising the steps of:
- a) defining a rectangular or substantially rectangular bottom portion and a side wall portion arranged to extend upward from an outer circumferential portion of the bottom portion by a die casting process as a single continuous monolithic workpiece, the side wall portion including four outside surfaces including a first outside surface and a second outside surface perpendicular or substantially perpendicular to the first outside surface;
- b) defining a partially cylindrical side surface inside the side wall portion by a cutting process, the partially cylindrical side surface being arranged in a shape of a portion of a cylindrical surface, and arranged to be opposite to an outer circumference of the disk;
- c) defining a first cutting base region in the first outside surface by a cutting process in parallel with step b);
- d) defining a second cutting base region in the second outside surface by a cutting process in parallel with steps b) and c);
- e) coating each of the partially cylindrical side surface, the first cutting base region, and the second cutting base region with a coating agent after steps b) to d); and
- f) defining a bearing fixing portion arranged to have a bearing mechanism of the motor arranged thereon in a center of the partially cylindrical side surface by a cutting process after step e), with the workpiece held using the first and second cutting base regions as positioning bases.

13. The method according to claim 12, wherein each of the first and second cutting base regions is a top surface of a raised portion arranged to project sideways relative to a surrounding region.

14. The method according to claim 12, wherein each of the first and second cutting base regions is a bottom surface of a recessed portion which is recessed relative to a surrounding region.

15. The method according to claim 12, wherein the first outside surface has a length greater or substantially greater than that of the second outside surface.

16. The method according to claim 12, wherein a number of the first cutting base regions defined in the first outside surface is at least two.

17. The method according to claim 12, wherein
- step a) includes defining a first die-cast base region in the first outside surface, and defining a second die-cast base region in the second outside surface;
- the cutting processes in steps b) to d) are performed with the workpiece held using the first die-cast base region and the second die-cast base region as positioning bases; and
- step e) includes coating each of the first and second die-cast base regions with the coating agent.

18. The method according to claim 17, wherein each of the first cutting base region and the second cutting base region has an arithmetic mean roughness smaller than an arithmetic mean roughness of each of the first die-cast base region and the second die-cast base region.

19. The method according to claim 17, wherein a number of the first die-cast base regions defined in the first outside surface is at least two.

20. The method according to claim 19, wherein
- a number of the first cutting base regions defined in the first outside surface is at least two; and
- the at least two first die-cast base regions are defined between the at least two first cutting base regions in the first outside surface.

21. The method according to claim 12, wherein each of the cutting processes in steps b) to d) is performed by using the same cutting tool.

22. The method according to claim 12, further comprising a step of g) defining a disk opposing bottom surface arranged to be opposite to a lower surface of the disk in the bottom portion by a cutting process in parallel with steps b) to d), wherein step e) includes coating the disk opposing bottom surface with the coating agent.

* * * * *